(12) United States Patent
Young

(10) Patent No.: US 7,509,900 B2
(45) Date of Patent: Mar. 31, 2009

(54) SCROLL SAW WITH DUST COLLECTOR

(76) Inventor: Ronald E. Young, 914 Lincoln Ave., Apartment C, Cheswick, PA (US) 15024

( * ) Notice: Subject to any disclaimer, the term of this patent is extended or adjusted under 35 U.S.C. 154(b) by 202 days.

(21) Appl. No.: 09/789,408

(22) Filed: Feb. 20, 2001

(65) Prior Publication Data

US 2002/0112582 A1    Aug. 22, 2002

(51) Int. Cl.
*B26D 7/00*   (2006.01)
(52) U.S. Cl. ............................ 83/100; 83/167; 83/477.2
(58) Field of Classification Search ................. 83/100, 83/167, 477.2, 781; 144/252.1; D15/134, D15/133; 29/DIG. 79, DIG. 94, DIG. 102; 409/137, 253; 408/67
See application file for complete search history.

(56) References Cited

U.S. PATENT DOCUMENTS

| 922,840 | A | * | 5/1909 | Bemiller ........................ 83/100 |
| D152,226 | S | * | 12/1948 | Stevens ........................ D15/133 |
| 2,579,955 | A | * | 12/1951 | Orescan ........................ 83/100 |
| 2,635,651 | A | * | 4/1953 | Hulfish ........................ 83/98 |
| 2,725,082 | A | * | 11/1955 | Duron ..................... 29/DIG. 94 |
| 3,135,151 | A | * | 6/1964 | Link et al. ..................... 83/100 |
| 3,669,163 | A | * | 6/1972 | Crane ........................ 83/100 |
| 4,061,126 | A | * | 12/1977 | Schlangen .................. 451/296 |
| 4,255,995 | A | * | 3/1981 | Connor ......................... 83/100 |
| 4,285,257 | A | * | 8/1981 | Eberle et al. .................. 83/100 |
| 4,381,628 | A | | 5/1983 | Dicke |
| 4,414,743 | A | | 11/1983 | Pioch et al. |
| 4,549,371 | A | | 10/1985 | Hakoda |
| 4,614,037 | A | | 9/1986 | Somers |
| 4,674,381 | A | * | 6/1987 | Cadorin ........................ 83/752 |
| 4,730,397 | A | | 3/1988 | Weiford et al. |
| 4,813,462 | A | * | 3/1989 | Linn ........................ 144/252.1 |
| 4,967,516 | A | | 11/1990 | Hoshino et al. |
| 5,022,156 | A | * | 6/1991 | Kallens et al. ................ 30/125 |
| 5,063,802 | A | | 11/1991 | Shiotani et al. |
| 5,065,652 | A | * | 11/1991 | Legler et al. .................. 83/168 |
| 5,158,001 | A | * | 10/1992 | Udelhofen et al. ............ 83/100 |
| 5,172,680 | A | * | 12/1992 | Swan .......................... 83/100 |
| 5,176,059 | A | | 1/1993 | Anderson |
| 5,349,752 | A | * | 9/1994 | Stirm ...................... 144/252.1 |

(Continued)

FOREIGN PATENT DOCUMENTS

WO    WO 98/56529    * 12/1998

OTHER PUBLICATIONS

"Scrollsaws", *American Woodworker*, 1999 Tool Buyer's Guide, pp. 136-138, 152.

(Continued)

*Primary Examiner*—Jason Daniel Prone
(74) *Attorney, Agent, or Firm*—Michael Aronoff; Adan Ayala (57) ABSTRACT

A dust collector for a power tool, such as a scroll saw, wherein the saw may include a base, a table supported by the base and a blade passing through a slot in the table. The dust collector may include a container defining an accumulation chamber and having an inlet port for collecting dust from the blade, a notch for receiving an assembly attached to the base and a locking device for removably attaching the container to the base. The dust collector may further include an outlet port for connecting a vacuum hose. The scroll saw may also include a removable storage drawer.

30 Claims, 10 Drawing Sheets

U.S. PATENT DOCUMENTS

| | | | |
|---|---|---|---|
| 5,419,737 A | 5/1995 | Brazell et al. | |
| 5,445,056 A | 8/1995 | Folci | |
| 5,449,256 A * | 9/1995 | Sundman | 408/710 |
| 5,470,272 A | 11/1995 | Kikuchi et al. | |
| 5,735,186 A * | 4/1998 | Piccini | 83/100 |
| 5,778,752 A | 7/1998 | Chen | |
| 5,819,619 A | 10/1998 | Miller et al. | |
| D407,094 S | 3/1999 | Meredith et al. | |
| 5,884,544 A * | 3/1999 | Theising et al. | 83/100 |
| 5,941,766 A * | 8/1999 | Iversen | 83/100 |
| 5,983,445 A * | 11/1999 | Baker | 144/252.1 |
| D423,525 S * | 4/2000 | Brazell et al. | D15/133 |
| D429,260 S * | 8/2000 | Ohi et al. | D15/133 |
| 6,119,567 A * | 9/2000 | Schindler et al. | 83/171 |
| 6,267,038 B1 | 7/2001 | O'Banion et al. | |
| 6,289,956 B1 * | 9/2001 | Shriver | 83/100 |
| 6,293,321 B1 * | 9/2001 | Chiang | 144/252.1 |
| D453,346 S * | 2/2002 | Young | D15/133 |
| D453,778 S * | 2/2002 | Young | D15/133 |
| 6,370,997 B1 * | 4/2002 | Rugen et al. | 83/100 |
| 6,382,278 B1 * | 5/2002 | Liao et al. | 83/100 |
| 6,405,406 B1 * | 6/2002 | Chen | 83/100 |
| 6,427,570 B1 * | 8/2002 | Miller et al. | 83/100 |
| 6,431,040 B1 * | 8/2002 | Miller et al. | 83/100 |
| 6,467,176 B1 * | 10/2002 | Frech et al. | 83/574 |
| 6,470,778 B1 * | 10/2002 | Kaye, Jr. et al. | 83/100 |
| 6,470,930 B1 * | 10/2002 | Stottmann | 144/252.1 |
| 6,510,772 B2 * | 1/2003 | Brickner, Jr. et al. | 83/100 |
| 6,651,710 B2 * | 11/2003 | Chuang | 144/252.1 |
| 6,679,145 B1 * | 1/2004 | Lee | 83/100 |
| 6,722,239 B2 * | 4/2004 | Liao et al. | 83/100 |
| 6,772,664 B2 * | 8/2004 | Chiang | 83/100 |
| 6,837,134 B2 * | 1/2005 | Chin-Chin | 83/100 |
| 6,948,412 B2 * | 9/2005 | Brazell et al. | 83/100 |
| 7,231,857 B2 * | 6/2007 | Hill et al. | 83/100 |
| 2003/0209120 A1 * | 11/2003 | Liao et al. | 83/100 |
| 2004/0007109 A1 * | 1/2004 | Chiang | 83/788 |
| 2004/0112191 A1 * | 6/2004 | Whiffen | 83/98 |
| 2004/0112193 A1 * | 6/2004 | Chang | 83/100 |
| 2007/0044609 A1 * | 3/2007 | Brazell et al. | 83/100 |

OTHER PUBLICATIONS

"Talon Power Tools Bench Top", *Talon Power Tools Engineered Performance*, International Catalogue 98/99 Program, pp. 20, et al.

* cited by examiner

SCROLL SAW WITH DUST COLLECTOR

BACKGROUND OF THE INVENTION

1. Field of the Invention

The invention relates to electric power tools and dust collection apparatuses therefor and, more particularly, to a scroll saw having a dust collection device.

2. Description of the Invention Background

Scroll saws are woodworking power tools with relatively thin blades that generate dust, chips or debris during normal operation. The blade typically extends between an upper arm and a lower arm and is held by clamping devices. The lower arm is supported by a base, which supports a table on which the workpiece is normally positioned. The blade passes through a hole or slot in the table, and dust falls through the slot during the cutting operation. As dust accumulates under the table, it can interfere with the proper operation of the saw including the ventilation of the drive motor. For this reason, dust is often blown off the working surface by a fan, or an air nozzle. In efforts to address such problems, various dust collection systems have been devised, operating with or without an air nozzle, and with or without suction hoses that vacuum the dust. Many of these dust collection systems include ducts or chutes that are an integral part of the particular saw, a feature that unnecessarily complicates the design of the saw and increases manufacturing and maintenance costs.

U.S. Pat. No. 5,884,544 discloses a non-integral vacuum attachment assembly for a scroll saw. The vacuum attachment assembly includes a bracket, which is attached to a table bevel lock knob for tilting the table of a scroll saw, and a vacuum hose connected to an opening in the bracket for receiving sawdust. This dust collection system requires the continuous operation of a vacuum hose and cannot be removed without operating the table bevel lock knob.

There remains, therefore, a need for an improved dust collector for power tools, such as scroll saws, that overcomes the limitations, shortcomings and disadvantages of the prior-art dust collection systems without compromising their advantages.

SUMMARY OF THE INVENTION

The invention meets the identified needs, as well as other needs, as will be more fully understood following a review of this specification and drawings.

One embodiment of the invention is directed to a dust collector for a scroll saw or other power tool that typically includes a base, a table supported by the base and a blade passing through a slot on the table. The dust collector includes an inlet port for collecting dust from the blade and generally disposed under the slot. The dust collector may be removably supported on the base and, if desired, may be removably attached to the base, for example, by a spring lock operated by a knob on the dust collector.

The dust collector may also have an outlet port for receiving a vacuum hose, and a notch to receive an assembly protruding from the base, such as a device holding a lower end of the blade or a device for tilting the table. The dust collector is also shaped to avoid interference with the table in any tilted position.

A removable storage drawer on a side of the base may also be provided for the scroll saw.

Other features and advantages of the invention will become apparent from the detailed description of the embodiments set forth herein and from the appended claims.

DETAILED DESCRIPTION OF THE INVENTION

Figure 1:
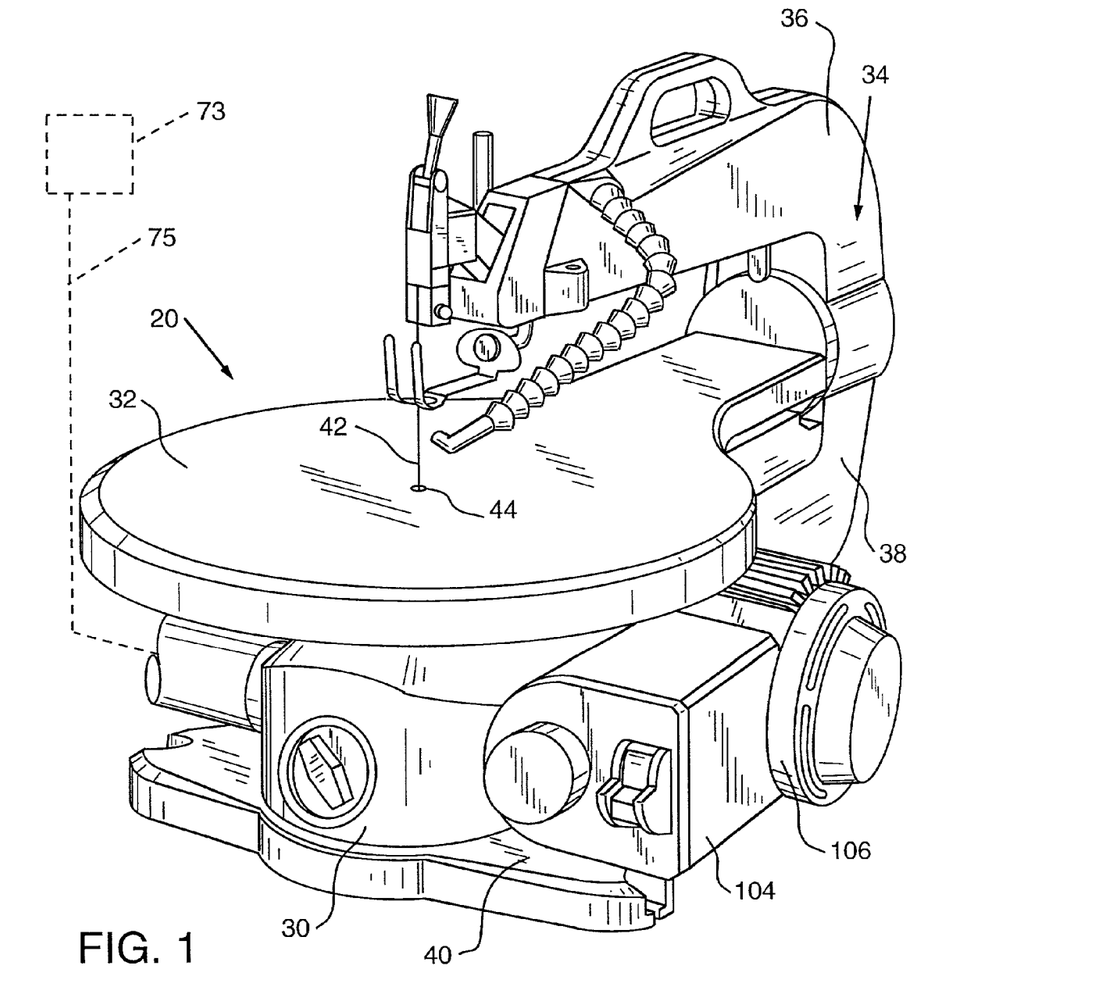
FIG. 1 is a front and right side isometric view of a scroll saw incorporating an embodiment of a dust collector according to the invention.
Figure 2A:
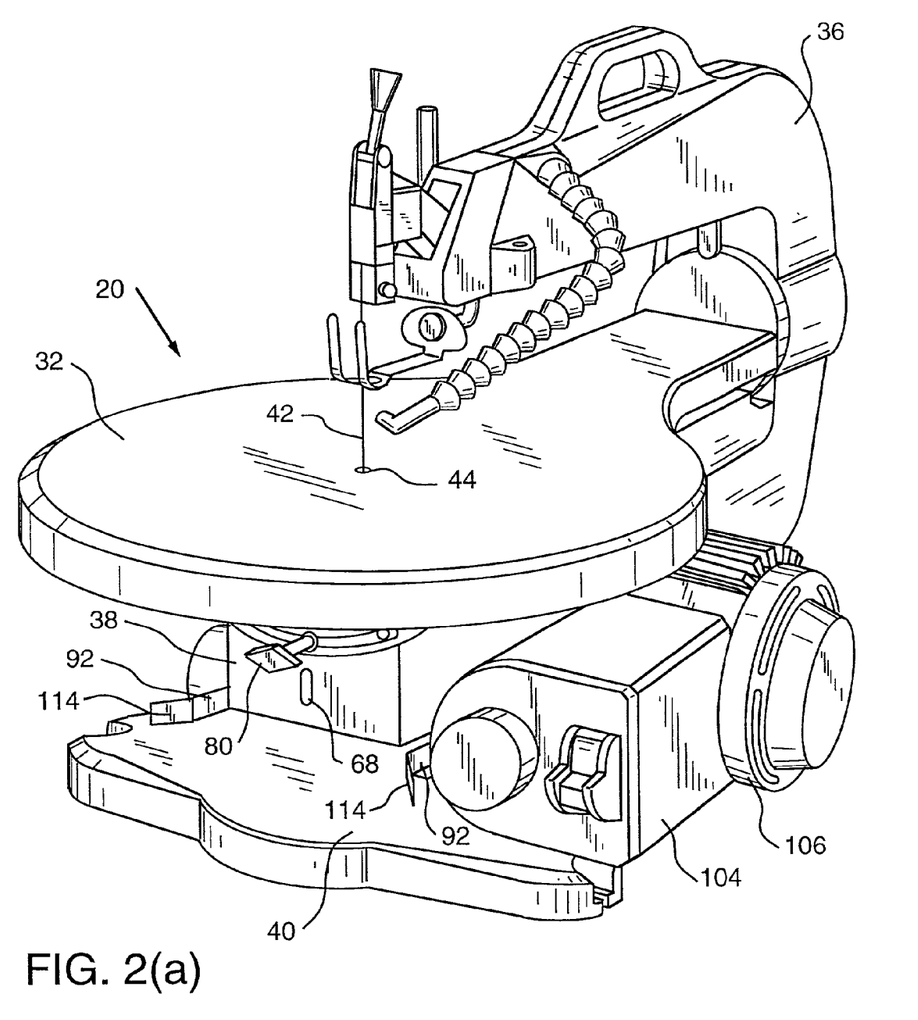
FIG. 2(a) is a front and right side isometric view of the scroll saw of FIG. 1 with the dust collector removed.
Figure 2B:
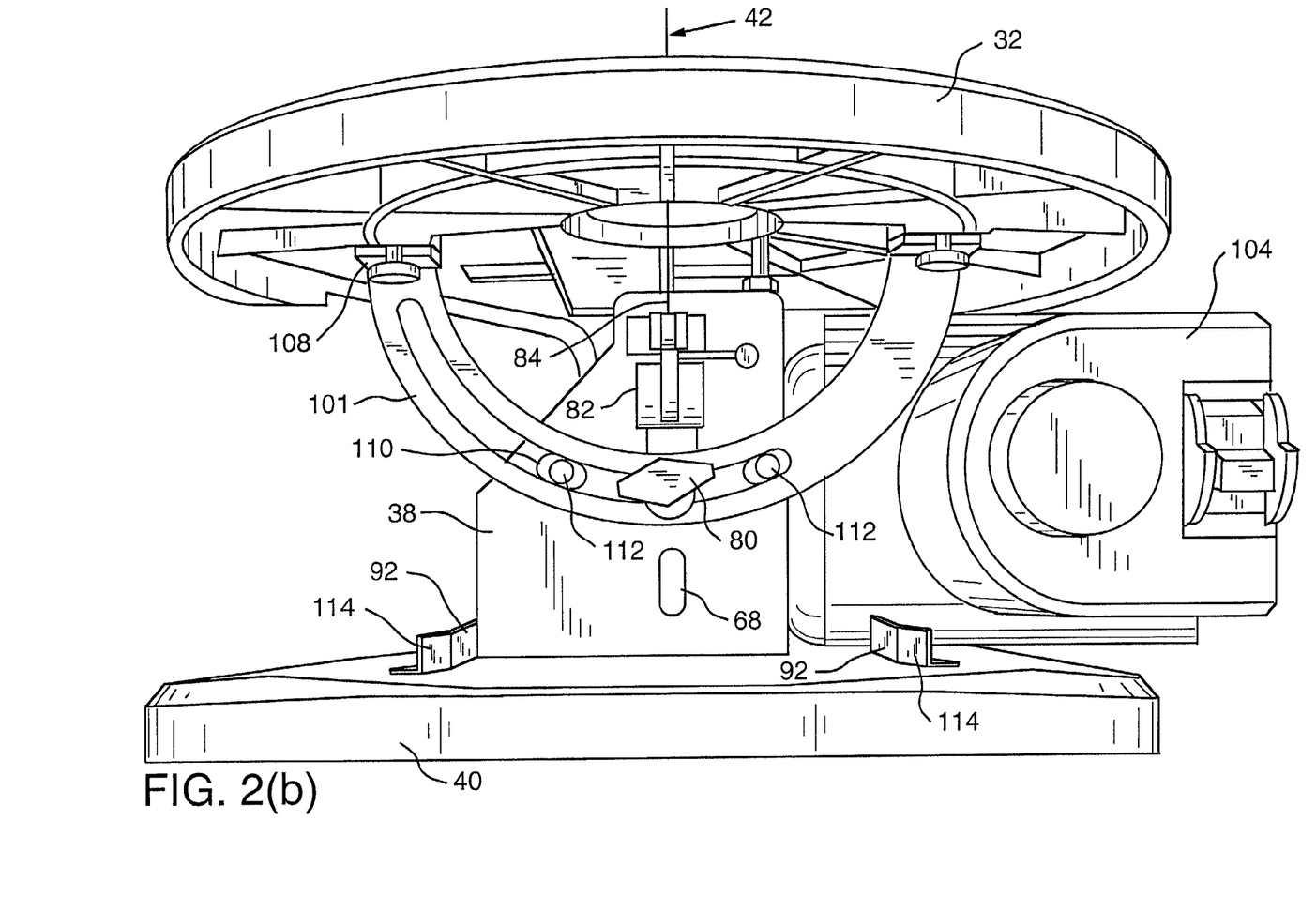
FIG. 2(b) is a front isometric view of the scroll saw of FIG. 1 with the dust collector removed.
Figure 3:
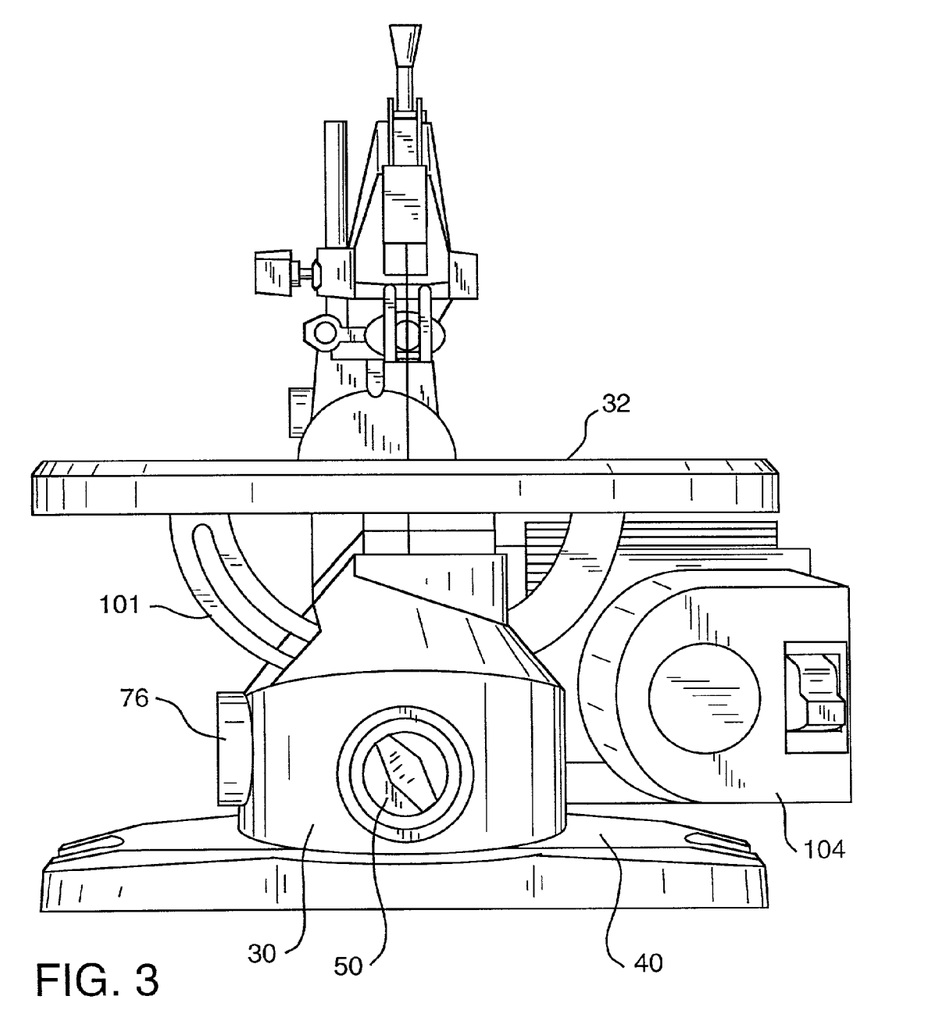
FIG. 3 is a front view of the scroll saw of FIG. 1.
Figure 4:
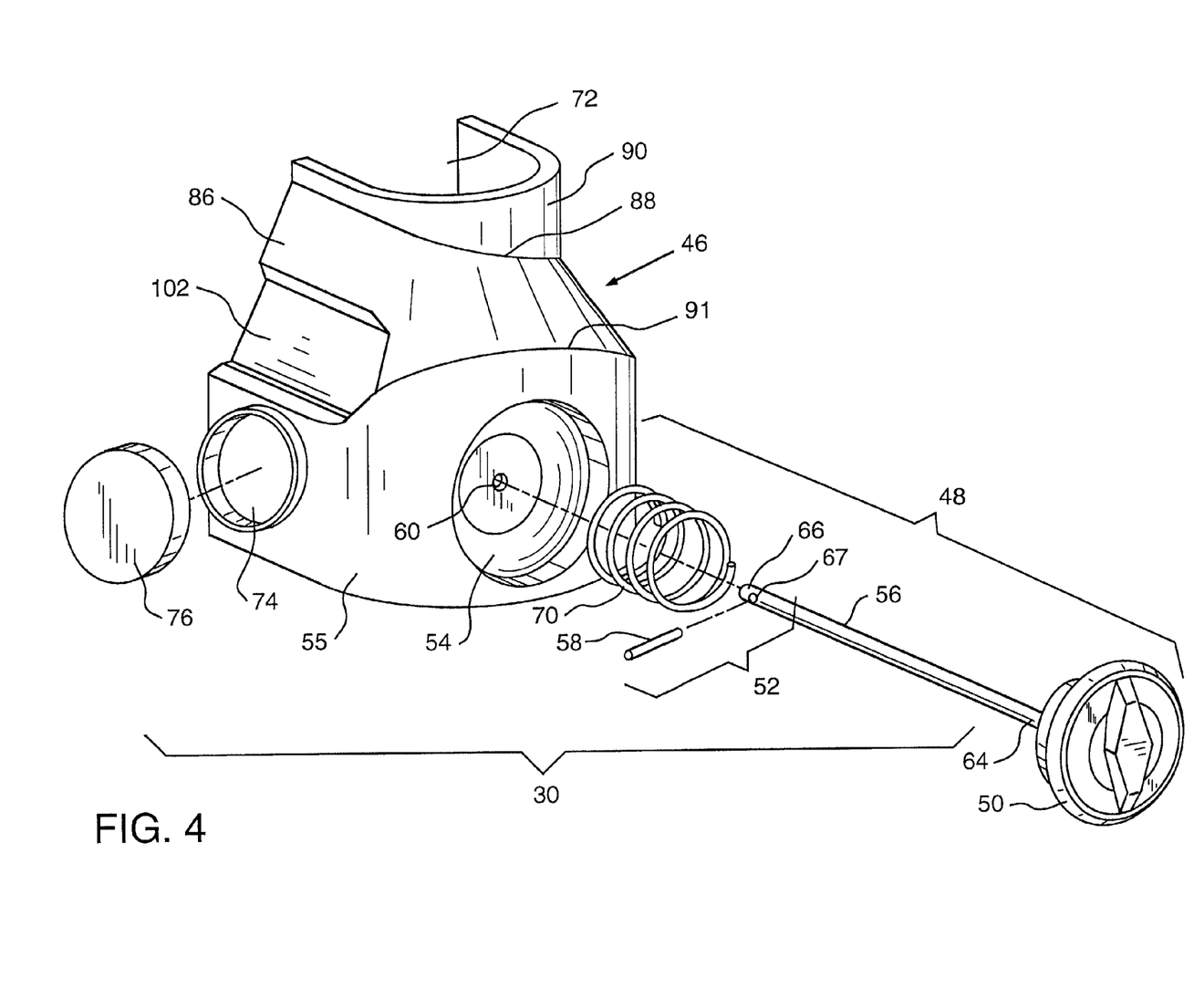
FIG. 4 is an exploded left side isometric view of the dust collector of FIG. 1.

Referring now to the drawings for the purpose of illustrating the invention and not for the purpose of limiting the same, FIG. 1 is an isometric view of a scroll saw 20 incorporating an embodiment of a dust collector 30 according to the invention. While the scroll saw 20 illustrated and described herein is particularly well-suited for use with various dust collector embodiments of the present invention, those of ordinary skill in the art will appreciate that various embodiments of the present invention could be successfully used in connection with other scroll saws, power tools, etc. without departing from the spirit and scope of the present invention. Therefore, the protection afforded to various embodiments of the invention should not be limited solely to use in connection with a scroll saw of the type described herein.

The scroll saw 20 depicted in FIG. 1 includes a table 32 supported by a base 34, a control box 104 and a motor assembly 106. The base 34 may typically include an upper body 36, a lower body 38 and a support plate 40. A conventional cutting blade 42 extends between the upper body 36 and the lower body 38 of the base 34 and passes through a slot 44 or similar aperture on the table 32. The top and bottom ends of the blade are removably attached to blade support members by conventional blade clamping arrangements. The operation of the blade and its attachment are well known in the art and, therefore, will not be discussed in great detail herein. It will be further understood that the motor assembly reciprocatingly drives the cutting blade or member in a known manner.

As shown throughout FIGS. 1-10, one embodiment of the dust collector 30 of the present invention includes a container 46 that defines an accumulation chamber generally designated as 47. As will be discussed in further detail below, the accumulation chamber 47 serves to collect dust and debris generated by the cutting member or blade 42 as it cuts through a workpiece (not shown), which may comprise a wooden board or other article. The container 46 is sized to be received under the table 32 and is oriented such that dust and debris fall through the slot 44 in the table. The container 46 may or may not be supported on the base 34.

In the embodiment in which the container is supported on the base 34, the container may be provided with a locking device 48. The locking device 48 may include a control knob 50 for rotating a key 52. See FIG. 4. The knob 50 is received in a recess 54 on a lateral wall 55 of the container 46. The key 52 generally includes a shaft 56 and a cross pin 58 that extends transversely through a hole 67 provided in a rear end 66 of the shaft 56 and is retained therein by, for example, an interference or shrink fit or friction fit. The knob 50 is attached to the front end 64 of the shaft 56 by any means apparent to those of ordinary skill in the art. The shaft 56 enters the container 46 through a front hole 60 in the recess 54 and exits through a back hole 62 in a back panel 63 of the container 46. See FIG. 5. The shaft 56 is attached at a forward end 64 to the knob 50 and at the rear end 66 to the cross pin 58, preventing the key 52 from completely sliding out of the container 46. Rotating the knob 50 causes the cross pin 58 to rotate accordingly. To removably attach the container 46 to the scroll saw, a correspondingly shaped keyhole 68 is provided through a portion of the lower body 38 of the base 34 for receiving the cross pin therein. A spring 70, received on the shaft 56 between the knob 50 and the recess 54, biases the cross pin into locking engagement with the lower body 38 to retain it in that locking position. Thus the container 46 is removably attached to the scroll saw 20 by aligning the cross pin 58 with the keyhole 68, inserting the cross pin 58 into the keyhole 68 and turning the knob 50 to move the cross pin 58 to a position wherein it cannot pass back through the keyhole 68, thereby locking the container 46 to the scroll saw 20.

Also in this embodiment, the container 46 includes an inlet port 72, which is oriented under the slot 44 and around a portion of the blade 42 that extends through the slot 44, so that the dust or chips generated by the operation of the blade fall into the container 46. The container 46 may also be provided with an outlet port 74 that extends through the lateral wall 55 for receiving a vacuum hose 75 that is interconnected to a source of vacuum 73 to vacuum the collected dust. See FIG. 1. In this embodiment, the outlet port 74 is generally disposed on a part of the wall 55 which, when the dust collector 30 is installed on the scroll saw 20, is unobstructed and remote from the control box 104 and the motor assembly 106. The collected dust may also be disposed of manually by unlocking the key 52 and removing the container 46 to permit the user to dump the sawdust collected therein through the inlet port 72. A cover 76 may be used to close the outlet port 74 when the vacuum hose 75 is not in attached thereto.

Figure 5:
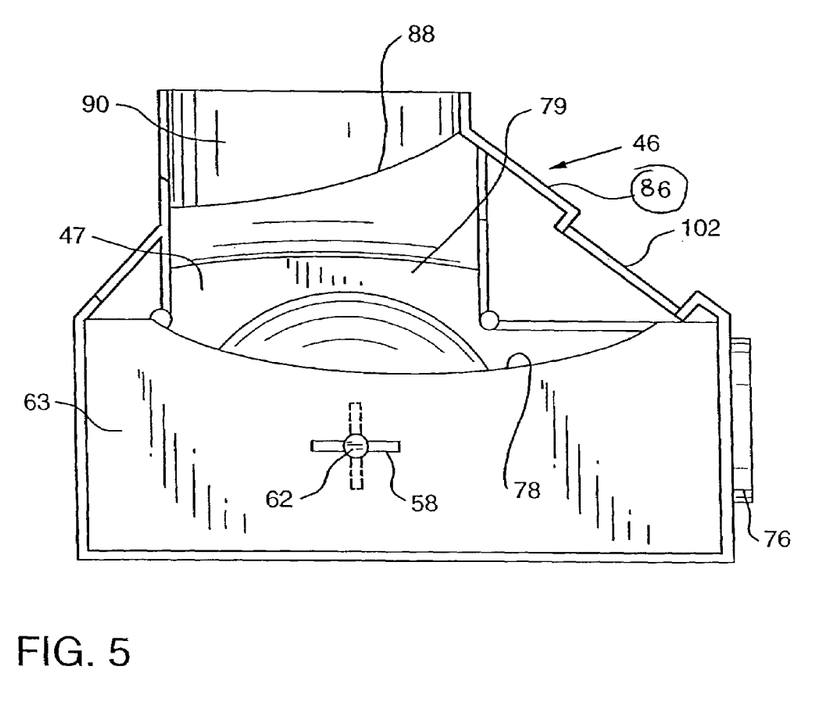
FIG. 5 is a rear view of the dust collector of FIG. 1.

As can be seen in FIG. 5, a portion of a back panel 63 may be provided with a notch 78 to accommodate components of the scroll saw 20 that protrude from the lower body 38 of the base 34 into the area in which the container is mounted, such as a table lock component 80, which operates to lock the table 32 in a tilted position. It will be further appreciated that the interior 79 of the container 46 and the inlet port 72 are sized so as to avoid interference with an under the table 32 clamping assembly 82 that is used for clamping the lower end 84 of the blade 42. The notch 78 also provides clearance for screws 112 holding glides 110, over which a beveling guide (trunnion) 101 glides.

Figure 6:
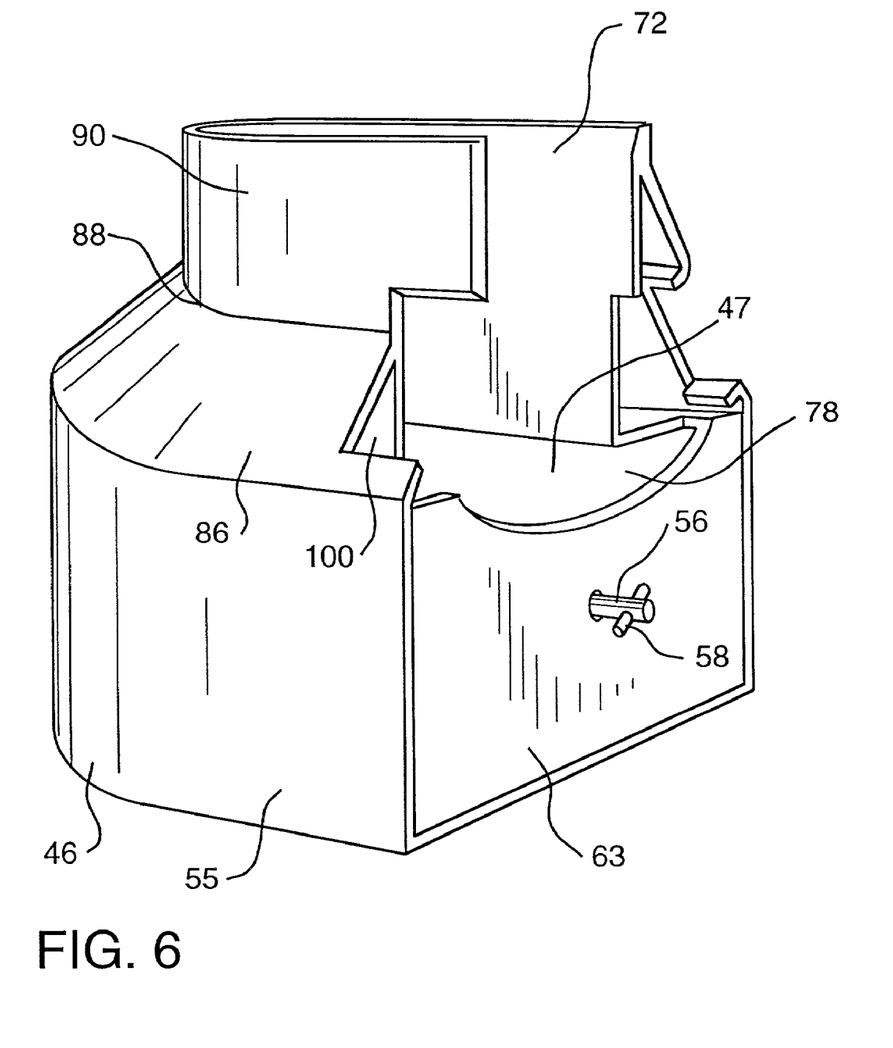
FIG. 6 is a rear and left side isometric view of the dust collector of FIG. 1.
Figure 7:
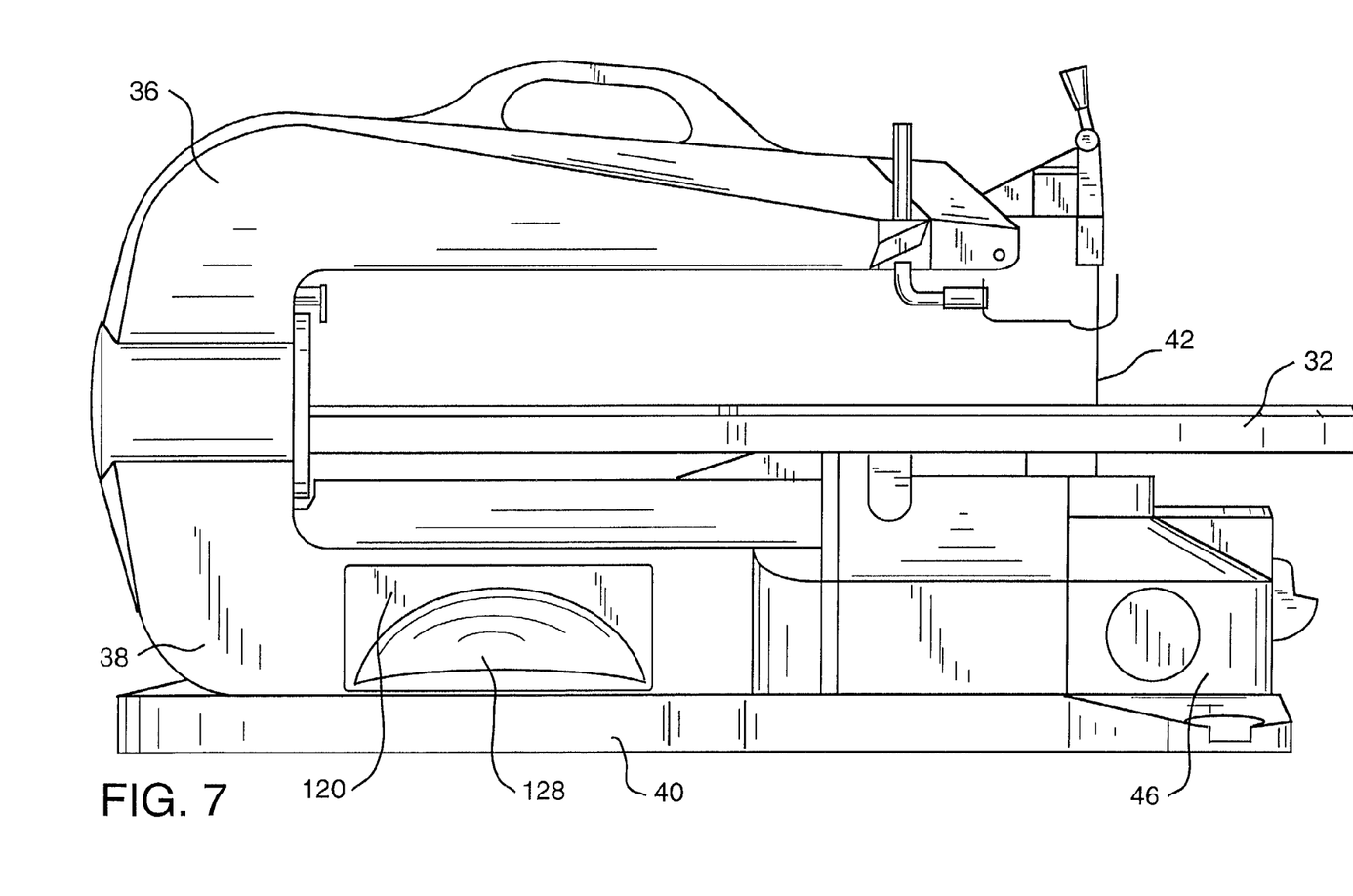
FIG. 7 is a left side elevational view of the scroll saw of FIG. 1 incorporating an embodiment of a storage drawer.
Figure 8:
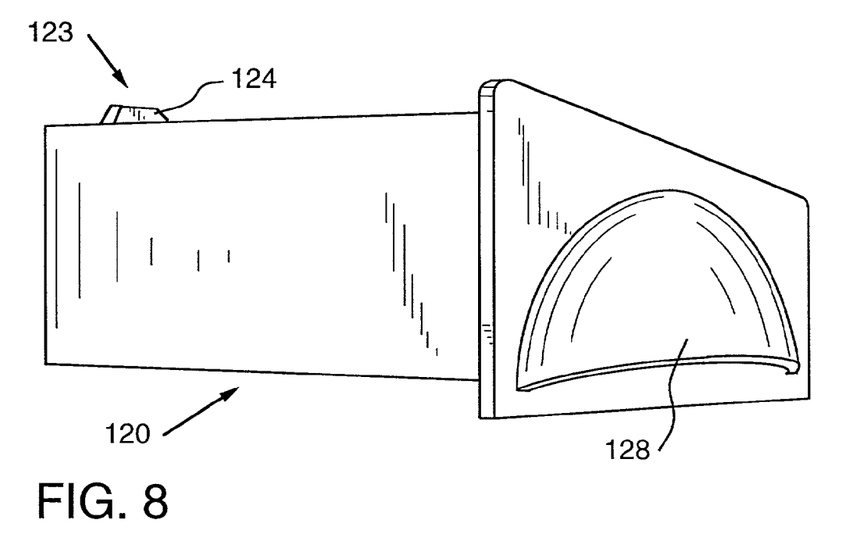
FIG. 8 is a left side perspective view of the storage drawer of FIG. 7.
Figure 9:
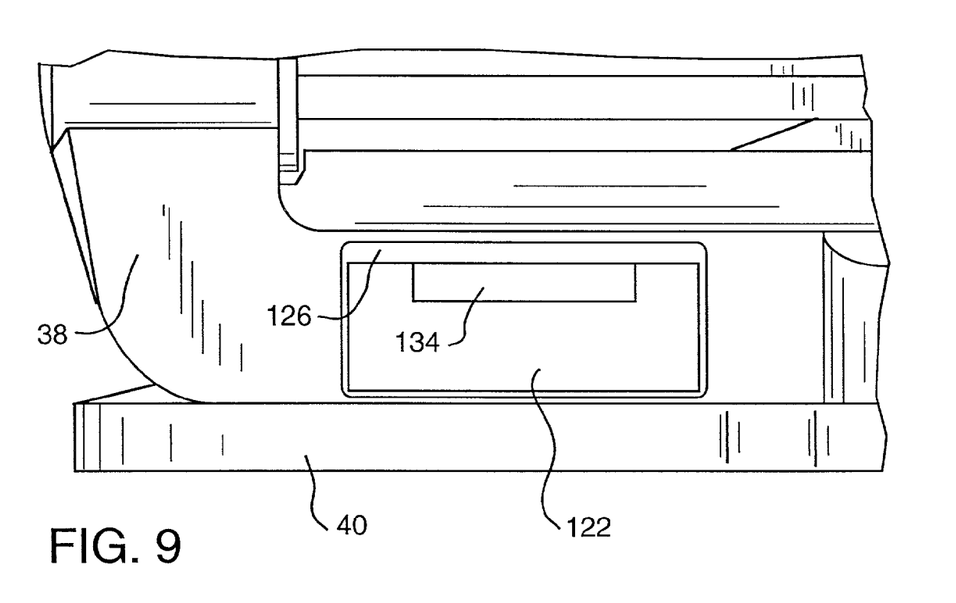
FIG. 9 is a partial left side elevational view of the scroll saw of FIG. 7 with the storage drawer removed.
Figure 10:
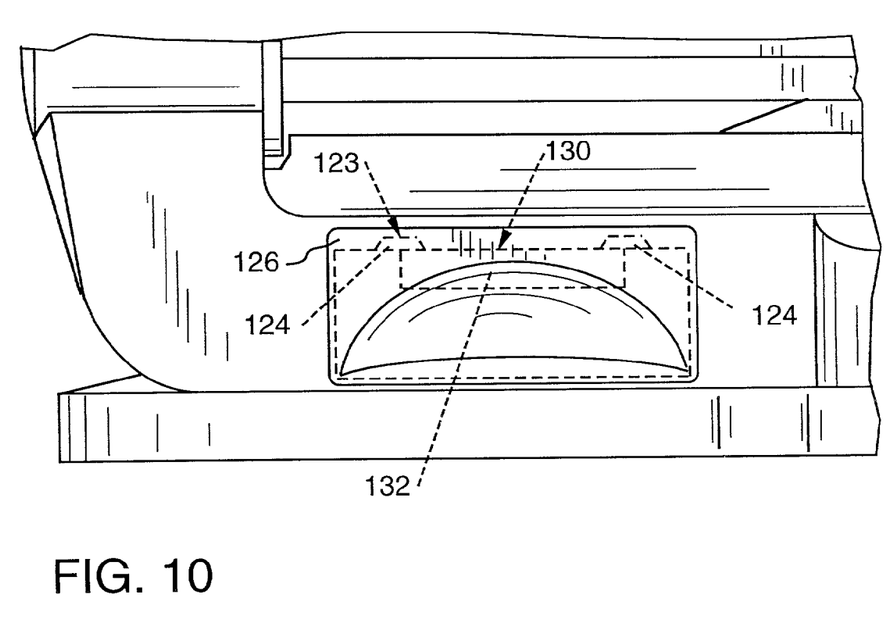
FIG. 10 is a partial left side elevational view of the scroll saw of FIG. 7 with the storage drawer supported therein.

As can be seen in FIG. 6, this embodiment of the container 46 has a skirt 86 shaped so that it does not interfere with the table 32 when the table 32 is tilted along the beveling guide 101 in a known manner. In the embodiment shown in FIG. 4, the skirt 86 slopes away from a first edge 88 toward a second edge 91. The first edge 88 bounds a collar 90 extending preferably vertically from the inlet port 72, and the second edge 91 is the boundary between the skirt 86 and the lateral wall 55. The first edge 88 is an asymmetric curve that produces an asymmetric skirt width, so that the skirt 86 provides greater clearance in the direction that the table is tilted. A cutout 100 in the skirt 86, as shown in FIG. 6, provides clearance space for the beveling guide 101. A flat groove 102 may be formed on a side of the skirt 86 that is furthest from the control box 104 and above the outlet port 74 to provide clearance for a fastening assembly 108 that attaches the beveling guide 101 to the table 32, when the table is tilted fully at an angle of 45°. Those of ordinary skill in the art will appreciate that the container 46 may be shaped to provide the requisite clearance for permitting the container 46 to be advantageously oriented to collect dust/debris from the cutting operation, while also providing clearance for a variety of different power tool configurations, such as, for example, band saws, overarm routers, drill presses, etc.

In the embodiments in which the container 46 is supported on the base 34, two guide bars 92 attached to the support plate 40 of the base 34 may be provided to guide the container 46 in place so that the cross pin 56 slides easily into the keyhole 68 and the inlet port 72 is oriented under the slot 44. The guide bars 92 may have ends 114 slanted outwards to facilitate and guide the container 46 into position on the support plate 40.

A drawer 120 may also be provided for storing components such as spare blades 42 and the like for the scroll saw 30, as shown in FIGS. 7-10. In one embodiment, the drawer 120 is sized to slide into a cavity 122 provided in the lower body 38 of the base 34. The drawer 120 may also be provided with a retainer 123 for preventing the drawer 120 from being inadvertently separated from the base 34. In one embodiment, the retainer 123 includes two tabs 124 adapted to engage a lip 126 in lower body 38 to thereby prevent the drawer 120 from sliding completely out of the cavity 122 in the horizontal position. Such an arrangement permits the drawer 120 to be removed by pivoting it so that the tabs 124 move inward the cavity 122 and out of engagement with the lip 126. The drawer 120 may include a handle 128 that may be integrally molded with the drawer 120. A drawer latching assembly 130 in the form of a first magnetic strip 132 attached to the back of the drawer and a second magnetic strip 134 attached to the lower body 38 in the interior of the cavity 122 may be provided to retain the drawer in a closed position within the cavity 122. Other drawer latch arrangements could also be employed.

Whereas particular embodiments of the invention have been described herein for the purpose of illustrating the invention and not for the purpose of limiting the same, it will be appreciated by those of ordinary skill in the art that numerous variations of the details, materials and arrangement of parts may be made within the principle and scope of the invention without departing from the invention as described in the appended claims.

What is claimed is:

1. A dust collector for a power tool having a base, a table supported by the base and an elongate cutting member having opposed first and second ends operably supported thereon and wherein the first end is operably supported above the table by a reciprocating support member, the dust collector comprising a container having an accumulation chamber therein, the container configured to be removably supported under the table on the base such that the second end of the elongate cutting member is disposed in the container, and dust dropping through a slot in the table accumulates in the accumulation chamber, wherein the container is removably affixed to the base by a locking device comprising a member adapted for rotation to lock the container to the base and to unlock the container from the base, the member adapted for rotation comprising a shaft rotatably supported in the container and a key disposed on the shaft and adapted to releasably engage the base.

2. The dust collector of claim 1, wherein a portion of the elongate cuffing member protrudes through the slot in the table and extends thereunder, and wherein the container has an inlet port therein above the accumulation chamber and sized to receive at least a portion of the elongate cuffing member protruding through the slot.

3. The dust collector of claim 1, further comprising guide members attached to the base for orienting the accumulation chamber under the slot in the table.

4. The dust collector of claim 1, wherein the key is affixed to an end of the shaft.

5. The dust collector of claim 4, wherein the key comprises a cross pin affixed to a rear end of the shaft.

6. The dust collector of claim 1, wherein the container has a back panel that has a notch therein to permit a portion of a table adjustment component attached to the base to extend into the accumulation chamber.

7. The dust collector of claim 1, further comprising an outlet port communicating with the accumulation chamber.

8. The dust collector of claim 7, further comprising a source of vacuum affixed to the outlet port.

9. The dust collector of claim 7, further comprising an outlet port cover removably affixed to the outlet port.

10. A dust collector for a power tool having a base, a table supported by the base and an elongate cutting member having opposed first and second ends operably supported thereon wherein the first end is operably supported above the table by a reciprocating support member and the second end is disposed below the table such that a portion of the elongate cutting member protrudes through a slot in the table and extends thereunder, the dust collector comprising:
  a container having an accumulation chamber therein and an in let port communicating with the accumulation chamber, the container sized to be slidably supported on the base such that the inlet port is oriented under the slot and receives the portion of the elongate cutting member having the second end disposed in the container; and
  a releasable locking device attached to the container and comprising a member adapted for rotation to lock the container to the base, the member adapted for rotation comprising a shaft rotatably supported in the container and a key disposed on the shaft and adapted to releasably engage the base.

11. The dust collector of claim 10, wherein the container has a back panel that has a notch therein for receiving a portion of a table adjustment component.

12. The dust collector of claim 10, further comprising a container guide assembly on the base.

13. The dust collector of claim 12, wherein the container guide assembly comprises a pair of spaced-apart guide bars attached to the base.

14. The dust collector of claim 10, wherein the key comprises a cross pin attached to a rear end of the shaft, the cross pin sized to pass through a keyhole in the base; and wherein the releasable locking device further comprises a control knob attached to a forward end of the shaft.

15. The dust collector of claim 10, further comprising an outlet port through the container.

16. The dust collector of claim 15, further comprising a cover attachable to the outlet port.

17. The dust collector of claim 15, further comprising a source of vacuum attached to the outlet port.

18. A dust collector for a power tool having a base, a table supported by the base and an elongate cutting member having opposed first and second ends operably supported thereon wherein the first end is operably supported above the table by a movable support member and the second end is disposed below the table such that a portion of the elongate cutting member protrudes through a slot in the table and extends thereunder, the dust collector comprising:
  a container having an accumulation chamber therein and an inlet port and an outlet port communicating with the accumulation chamber, the container removably supported on the base such that the second end of the elongate cutting member is disposed in the container;
  a shaft rotatably supported in the container and having a rear end protruding therefrom;
  a cross pin attached to the rear end of the shaft, the cross pin sized to pass through a keyhole in the base;
  a control knob on a forward end of the shaft; and
  a biasing member extending between the container and the control knob.

19. The dust collector of claim 18, further comprising a source of vacuum attached to the outlet port.

20. The dust collector of claim 18, further comprising a cover attachable to the outlet port.

21. A scroll saw, comprising:
  a base;
  a table supported by the base;
  a motor attached to the base;
  an elongate cutting blade having opposed first and second ends reciprocatingly driven by the motor, a portion of the elongate cutting blade protruding through a slot in the table and extending thereunder; and
  a container removably supported on the base, wherein at least a portion of the container defines an accumulation chamber oriented under the slot in the table and wherein the second end of the elongate cutting blade is disposed in the container, wherein the container is removably affixed to the base by a locking device comprising a member adapted for rotation to lock the container to the base and to unlock the container from the base, the member adapted for rotation comprising a shaft rotatably supported in the container and a key disposed on the shaft and adapted to releasably engage the base.

22. The scroll saw of claim 21, wherein the key comprises a cross pin attached to a rear end of the shaft, the cross pin sized to be inserted into a keyhole in the base; and wherein the releasable locking device further comprises:
  a control knob on a forward end of the shaft; and
  a biasing member extending between the container and the control knob.

23. The scroll saw of claim 21, further comprising guide bars on the base for orienting the removable container thereon.

24. The scroll saw of claim 21, further comprising an outlet port in the container and a removable cover attachable to the outlet port.

25. The scroll saw of claim 21, further comprising:
  an outlet port in the container; and
  a source of vacuum attached to the outlet port.

26. The scroll saw of claim 21, wherein the table is pivotably supported on the base and is selectively lockable in a desired tilted position by a table locking assembly and wherein the container has a back panel with a notch to enable a portion of the table locking assembly to protrude into the container.

27. A dust collector for a power tool having a base, a table supported by the base and an elongate cutting member having opposed first and second ends operably supported thereon and wherein the first end is operably supported above the table by a reciprocating support member, the dust collector comprising a container having an accumulation chamber therein, the container configured to be removably supported under the table on the base such that the second end of the elongate culling member is disposed in the container, and dust dropping through a slot in the table accumulates in the accumulation chamber, wherein the container is removably affixed to the base by a locking device comprising a rotatably releasable key assembly adapted to releasably engage a portion of the base, the key assembly comprising a shaft rotatably supported in the container and a key disposed on the shaft and adapted to releasably engage the base.

28. The dust collector of claim 27, wherein the key assembly comprises a cross pin affixed to a rear end of the shaft.

29. A dust collector for a power tool having a base, a table supported by the base and an elongate cutting member having opposed first and second ends operably supported thereon wherein the first end is operably supported above the table by a reciprocating support member and the second end is disposed below the table such that a portion of the elongate cutting member protrudes through a slot in the table and extends thereunder, the dust collector comprising:
- a container having an accumulation chamber therein and an inlet port communicating with the accumulation chamber, the container sized to be slidably supported on the base such that the inlet port is oriented under the slot and receives the portion of the elongate cutting member having the second end disposed in the container; and
- a releasable locking device attached to the container to lock the container to the base, wherein the releasable locking device comprises
  - a shaft rotatably supported in the container and having a rear end protruding therefrom,
  - a cross pin attached to the rear end of the shaft, the cross pin sized to pass through a keyhole in the base, and
  - a control knob attached to a forward end of the shaft.

30. A scroll saw, comprising:
- a base;
- a table supported by the base;
- a motor attached to the base;
- an elongate cuffing blade having opposed first and second ends reciprocatingly driven by the motor, a portion of the elongate cuffing blade protruding through a slot in the table and extending thereunder; and
- a container removably supported on the base, wherein at least a portion of the container defines an accumulation chamber oriented under the slot in the table, the second end of the elongate cuffing blade is disposed in the container, and the container is removably locked to the base by a releasable locking device comprising
  - a shaft rotatably supported in the container,
  - a cross pin attached to a rear end of the shaft, the cross pin sized to be inserted into a keyhole in the base,
  - a control knob on a forward end of the shaft, and
  - a biasing member extending between the container and the control knob.

* * * * *

UNITED STATES PATENT AND TRADEMARK OFFICE
CERTIFICATE OF CORRECTION

| | | |
|---|---|---|
| PATENT NO. | : 7,509,900 B2 | Page 1 of 1 |
| APPLICATION NO. | : 09/789408 | |
| DATED | : March 31, 2009 | |
| INVENTOR(S) | : Ronald E. Young | |

It is certified that error appears in the above-identified patent and that said Letters Patent is hereby corrected as shown below:

Title Page; item (74);

Front Page, delete "*Attorney, Agent, or Firm* Michael Aronoff; Adan Ayala" and substitute --*Attorney, Agent, or Firm* K&L Gates LLP--

Column 3, line 43, delete "vacuum hose 75 is not in attached thereto" and substitute --vacuum hose 75 is not attached thereto--

Column 5, line 2, delete "elongate cuffing member" and substitute --elongate cutting member--

Column 5, line 5, delete "of the elongate cuffing" and substitute --of the elongate cutting--

Column 5, line 33, delete "an in let port communicating" and substitute --an inlet port communicating--

Column 7, line 2, delete "elongate culling member" and substitute --elongate cutting member--

Column 8, line 10, delete "elongate cuffing blade" and substitute --elongate cutting blade--

Column 8, line 12, delete "elongate cuffing blade" and substitute --elongate cutting blade--

Column 8, line 17, delete "end of the elongate cuffing" and substitute --end of the elongate cutting--

Signed and Sealed this

Twenty-third Day of March, 2010

David J. Kappos
*Director of the United States Patent and Trademark Office*